Patented Dec. 15, 1936

2,064,782

UNITED STATES PATENT OFFICE 2,064,782

THIAZYL DERIVATIVES AND PROCESS OF MAKING

Howard I. Cramer, Cuyahoga Falls, Ohio, assignor to Wingfoot Corporation, Wilmington, Del., a corporation of Delaware No Drawing. Application April 7, 1934, Serial No. 719,598

11 Claims. (Cl. 260—44)

This invention relates to a new and useful class of chemical compounds and to a method of preparing them. More particularly, it concerns a class of materials which may be termed thiazyl esters of secondary alicyclic dithiocarbamic acids. Although these compounds may perhaps be prepared by other methods as well, they are preferably formed by reacting a suitable salt of a secondary alicyclic dithiocarbamic acid with a halogen aryl thiazole. While the compounds of the invention may be used for any purpose for which they are suited, it has been found that they are in general good accelerators of rubber vulcanization.

Although any halogen aryl thiazole may be employed, it has been found that the 1-chlor aryl thiazoles are particularly well adapted for the purposes of the invention. Of the 1-chlor aryl thiazoles, 1-chlor 5-nitro benzothiazole in particular has been found to give rise to products which are excellent accelerators of the vulcanization or rubber. It will, of course, be understood that other halogen aryl thiazoles may be employed in the practice of the invention, typical compounds being 1-chlor 5-methoxy benzothiazole, 1-chlor tolyl thiazole, 1-chlor benzothiazole, 1-chlor 4-nitro benzothiazole, 1-chlor 5-ethoxy benzothiazole, 1-chlor 5-methyl benzothiazole, 1-chlor dimethyl benzothiazoles, 1-chlor 4-chlor benzothiazole, 1-chlor 5-chlor benzothiazole, 1-chlor 3-phenyl benzothiazole, 1-chlor naphtho thiazoles and their nitro derivatives, 1-chlor 4-chlor 5-nitro benzothiazole and 1-chlor 3-methyl 5-nitro benzothiazole. These 1-halogen aryl thiazoles may conveniently be prepared by the process disclosed in United States Patent No. 1,757,930.

The dithiocarbamates employed may be represented by the formula

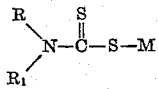

wherein R is an alicyclic group; $R_1$ is any hydrocarbon radical, alicyclic, aralkyl, aryl and alkyl radicals being typical; and M is any reactive metallic radical or equivalent grouping, such as sodium, potassium or ammonium, which does not seriously impair the solubility of the dithiocarbamate in the solvent employed in effecting the desired reaction. The secondary alicyclic dithiocarbamates used in the invention may be prepared according to the known procedure of interacting carbon bisulphide, an alkali and a secondary alicyclic amine. In many cases, however, it will not be necessary to prepare the dithiocarbamate before its reaction with the 1-halogen thiazole: it is equally practicable to form the dithiocarbamate in situ in a suspension of the 1-halogen thiazole in a solvent such as ethyl alcohol.

Illustrative of salts of secondary alicyclic dithiocarbamates which may be employed in the invention are potassium dicyclo hexyl dithiocarbamate, sodium N-ethyl cyclo hexyl dithiocarbamate, ammonium N-methyl cyclohexyl dithiocarbamate, zinc dicyclo hexyl dithiocarbamate, sodium cyclo hexyl beta phenethyl dithiocarbamate, sodium N-butyl cyclo hexyl dithiocarbamate, potassium benzyl cyclohexyl dithiocarbamate, potassium N-ethyl decahydro naphthyl dithiocarbamate and sodium N-methyl aryl tetra hydro naphthyl dithiocarbamate. Others are the dithiocarbamates derived from cyclo hexyl aniline, N-methyl hexahydro toluidine, N-methyl decahydro naphthylamine, N-isoamyl decahydro naphthylamine, N-propyl cyclo hexyl amine, N-isopropyl hexahydro xylidine, N-methyl hexahydro xylidine, benzyl alicyclic tetra hydro naphthylamine, N-ethyl alicyclic tetra hydro naphthylamine, N-benzyl hexahydro toluidine, N-ethyl hexahydro toluidine, N-ethyl aryl tetra hydro naphthylamine, and N-methyl alicyclic tetra hydro naphthylamine.

The desired halogen aryl thiazole may be caused to react with any secondary alicyclic dithiocarbamate to produce the corresponding reaction product. Although it is not known to be true in all cases, it is believed that the reaction proceeds according to the following general equation:

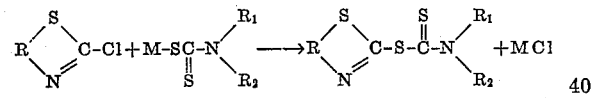

In certain cases other reactions may take place to the extent of perhaps thirty percent, yielding products which may or may not be separated, as desired, from the principal product. In many cases, particularly in the vulcanization of rubber, it will be desirable to employ the total composite reaction product as such.

The reaction product of 1-chlor 5-nitro benzothiazole and the sodium salt of dicyclo hexyl dithiocarbamate is an example of a compound falling within the scope of the invention. It may be prepared by refluxing in approximately equimolecular proportions 1-chlor 5-nitro benzothiazole, dicyclo hexyl amine, carbon bisulphide and sodium hydroxide in a solvent such as ethyl alcohol. After a period of from one half to three hours the reaction product precipitates as a crystalline material which may be washed with water to remove the sodium chloride formed during the reaction. The crystalline material, 5-nitro benzothiazyl 1-dicyclo hexyl dithiocarbamate, upon being further purified by recrystallizing from alcohol precipitates in the form of yellow crystals having a melting point of 188–189 degrees C. The product upon analysis is found to contain 9.94% nitrogen and 21.0% sulphur as compared with the theoretical percentages for 5-nitro benzothiazyl dicyclo hexyl dithiocarbamate of 9.65% nitrogen and 22.09% sulphur. The equation representing the reaction is probably as follows:

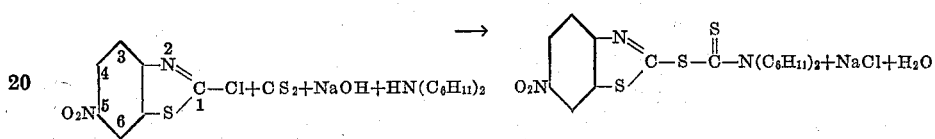

In similar manner 5-nitro benzothiazyl 1-N-ethyl cyclo hexyl dithiocarbamate is prepared from N-ethyl cyclo hexyl amine, 1-chlor 5-nitro benzothiazole, carbon bisulphide and sodium hydroxide. The product is obtained in the form of yellow crystals melting at 146–147 degrees C. It is found to analyze 10.50% nitrogen and 24.82% sulphur as compared with the theoretical percentages for 5-nitro benzothiazyl 1-N-ethyl cyclohexyl dithiocarbamate of 11.02% nitrogen and 25.22% sulphur. The reaction is believed to be represented as follows:

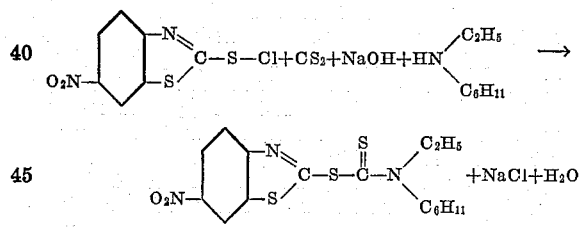

It will be understood that any of the dithiocarbamates previously disclosed may be formed in situ and reacted with any halogen aryl thiazole. Alternatively, a solution of the secondary alicyclic dithiocarbamates may first be prepared after which it may be reacted with the desired halogen aryl thiazole. It is believed that by the practice of the invention any aryl thiazyl ester of a secondary alicyclic dithiocarbamic acid may be prepared without regard to the nature of the substituents in the aryl ring or to their position therein. However, the 1-halogen nitro benzothiazoles have been found to be capable of being employed in the invention somewhat more conveniently than certain of the other thiazoles, the presence of the nitro group apparently facilitating the reaction. It will be understood that the brom aryl thiazoles and other halogen aryl thiazoles may be substituted for the chlor aryl thiazoles. Similarly, the 1-halogen naphthothiazoles may be substituted for the halogen benzothiazoles.

Conveniently, any one of these compounds or a mixture thereof may be added to any of the ordinary rubber mixes in an amount which may be determined according to the usual methods.

It has been found, for example, that the accelerators of the present invention are effective in a rubber composition of the following formula:

| | Parts by weight |
|---|---|
| Rubber (extracted pale crepe) | 100.0 |
| Zinc oxide | 5.0 |
| Sulphur | 3.0 |
| Stearic acid | 1.5 |
| Accelerator | 0.5 |

Samples of the compounded rubber made up in accordance with this formula were subjected to vulcanization by steam heat in a mold after which they were subjected to physical tests to ascertain their elasticities and tensile strength. Results of these tests are given in the following table:

| Cure in mins at °F. | Ult. tens. in kgs/cm² | Maximum elong. | Modulus in kgs/cm² | |
|---|---|---|---|---|
| | | | 500% | 700% |
| 5-Nitro benzothiazyl 1-N-ethyl cyclohexyl dithiocarbamate | | | | |
| 20/260 | 123 | 840 | 20 | 64 |
| 30/260 | 175 | 685 | 48 | |
| 40/260 | 178 | 710 | 42 | 170 |
| 60/260 | 184 | 750 | 36 | 134 |
| 5-Nitro benzothiazyl 1-di cyclohexyl dithiocarbamate | | | | |
| 20/260 | 165 | 750 | 28 | 114 |
| 30/260 | 190 | 710 | 42 | 170 |
| 40/260 | 190 | 705 | 45 | 185 |
| 60/260 | 190 | 715 | 42 | 170 |

It will be apparent from the preceding tables that the use of these compounds results in excellent cures at comparatively low temperatures, the vulcanized products having excellent physical qualities, both in regard to tensile strength and elongation. It may also be stated that these accelerators have excellent delayed action properties, making them particularly desirable in rubber stocks which frequently cause trouble from scorching or prevulcanization.

It will be understood that by the term "benzenoid" as employed herein it is meant to cover the members of the benzene and naphthalene series whether substituted or unsubstituted, typical substituents being alkyl, nitro, halogen, hydroxy and alkoxy groups. It will also be understood that by the term "rubber" is meant any of the ordinary forms of rubber, such as rubber latex, balata, gutta percha and the ordinary coagulated forms of the Hevea brasiliensis family. It will be understood that the specifically described details of the invention as herein given may be varied within comparatively wide limits without departing from the inventive concept and that it is desired to embrace within the scope of this invention such modifications and changes as may be necessary to adapt it to varying conditions and use. It is intended that the patent shall cover by suitable expression in the appended claims whatever features of patentable novelty reside in the invention.

What I claim is:

1. An arylene thiazyl ester of a dithiocarbamic acid in which the nitrogen atom of the dithiocarbamic acid is substituted by a radical selected from the group consisting of cyclohexyl, decahydro naphthyl and tetrahydro naphthyl radicals, said arylene being a member of the benzene and naphthalene series.

2. A nitro benzothiazyl ester of an alicyclic dithiocarbamic acid prepared from an alicyclic secondary amine selected from the group consisting of the cyclohexyl secondary amines, the decahydro naphthyl secondary amines and the tetrahydro naphthyl secondary amines.

3. A nitro benzothiazyl ester of an N-hydrocarbon N-cyclohexyl dithiocarbamic acid.

4. A compound having the formula

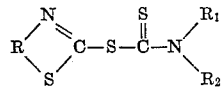

wherein R is an arylene radical of the benzene and naphthalene series, $R_1$ is a hydro aromatic radical of the benzene and naphthalene series and $R_2$ is hydrocarbon.

5. A compound having the formula

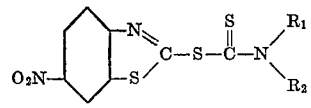

wherein $R_1$ is a cyclohexyl group and $R_2$ is an aliphatic hydrocarbon radical.

6. A nitro benzothiazyl 1-N-alkyl N-cyclohexyl dithiocarbamate.

7. A nitro benzothiazyl 1-dicyclohexyl dithiocarbamate.

8. 5-nitro benzothiazyl 1-dicyclo hexyl dithiocarbamate.

9. 5-nitro benzothiazyl 1 - N - ethyl - N - cyclohexyl dithiocarbamate.

10. An arylene thiazyl ester of a dithiocarbamic acid in which the nitrogen atom of the dithiocarbamic acid group is substituted by a hydro aromatic radical of the benzene and naphthalene series, said arylene being a member of the benzene and naphthalene series.

11. A nitro benzothiazyl ester of a dithiocarbamic acid prepared from a cyclo hexyl secondary amine.

HOWARD I. CRAMER.